United States Patent
Burger et al.

(10) Patent No.: US 12,272,981 B2
(45) Date of Patent: Apr. 8, 2025

(54) PULSE CURRENT METHOD OF ENHANCING THE FUNCTIONALITY OF A BATTERY

(71) Applicant: Nextech Batteries, Inc., Carson City, NV (US)

(72) Inventors: Bill Burger, Carson City, NV (US); Michael Schlicht, Carson City, NV (US)

(73) Assignee: Nextech Batteries, Inc.

( * ) Notice: Subject to any disclaimer, the term of this patent is extended or adjusted under 35 U.S.C. 154(b) by 995 days.

(21) Appl. No.: 16/917,154

(22) Filed: Jun. 30, 2020

(65) Prior Publication Data

US 2021/0044130 A1    Feb. 11, 2021

Related U.S. Application Data

(60) Provisional application No. 62/869,260, filed on Jul. 1, 2019.

(51) Int. Cl.
| | |
|---|---|
| *H02J 7/00* | (2006.01) |
| *H01M 10/0525* | (2010.01) |
| *H01M 10/42* | (2006.01) |
| *H01M 10/44* | (2006.01) |

(52) U.S. Cl.
CPC ..... *H02J 7/00711* (2020.01); *H01M 10/0525* (2013.01); *H01M 10/425* (2013.01); *H01M 10/44* (2013.01); *H02J 7/005* (2020.01); *H01M 2010/4271* (2013.01)

(58) Field of Classification Search
CPC ...... H02J 7/00711; H02J 7/005; H02J 7/0069; H01M 10/0525; H01M 10/425; H01M 10/44; H01M 2010/4271; H01M 10/4264; H01M 10/052; H01M 10/4242; Y02E 60/10

See application file for complete search history.

(56) References Cited

U.S. PATENT DOCUMENTS

| | | | |
|---|---|---|---|
| 6,469,473 B1 | 10/2002 | Schlicht | |
| 9,312,577 B2 * | 4/2016 | Jamison | ............... H01M 10/441 |
| 10,536,019 B2 | 1/2020 | Karim | |
| 11,698,658 B1 * | 7/2023 | Allen | ..................... H03K 3/037 |
| | | | 327/291 |
| 2003/0042871 A1 * | 3/2003 | Schlicht | ............... H02J 7/00711 |
| | | | 320/129 |
| 2017/0040806 A1 * | 2/2017 | Zaghib | .................. H01M 4/136 |
| 2018/0366957 A1 * | 12/2018 | Hale | .................... G01R 31/387 |
| 2019/0120910 A1 * | 4/2019 | Ghantous | ............... H02J 7/0047 |

* cited by examiner

*Primary Examiner* — Nha T Nguyen

(74) *Attorney, Agent, or Firm* — Gutwein Law; Tyler B. Droste

(57) ABSTRACT

A method to enhance the functionality of a battery through the use of a pulsing apparatus. The pulsing apparatus configured to improve cell conditioning, maintain battery cells, and overall cell function through pulsing a selected current into and out of a battery. The pulsing selected to deliver a predetermined number of pulses to the battery. The pulses having a slew rate of at least 0.1 A/μs, a pulse width between 1 μs and 10 ms with a pulse rise time of at least 1 μs to alter a current of the battery. Preferably the predetermined number of pulses is between 100 pulses per second and 1 pulse per minute.

29 Claims, 2 Drawing Sheets

PULSE CURRENT METHOD OF ENHANCING THE FUNCTIONALITY OF A BATTERY

CROSS REFERENCE TO RELATED APPLICATIONS

Figure 1:
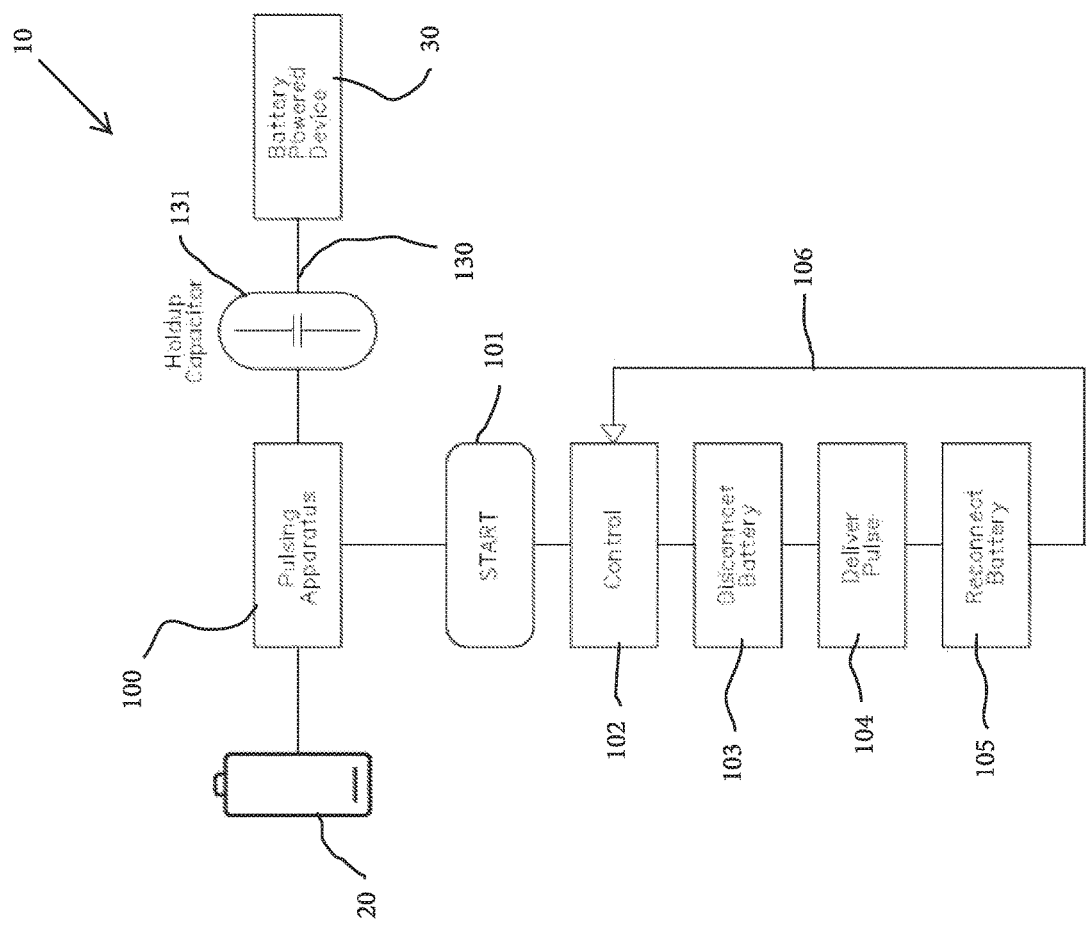

This application claims priority to prior filed U.S. Provisional Patent Application 62/869,260 filed 1 Jul. 2019 to one of the above-named inventors and is herein incorporated by reference in its entirety.

FEDERALLY SPONSORED RESEARCH OR DEVELOPMENT

Not Applicable

SEQUENCE USING, A TABLE, OR A COMPUTER PROGRAM

Not Applicable

FIELD OF THE INVENTION

The present invention relates to batteries, and more specifically, to a method of enhancing the functionality of a battery. Still further the method relates to batteries and a device configured to deliver a current pulse in coupling with a battery utilizing Li—S chemistries to prevent cell failures through the prevention of dendrite formation, rapidly form cells, aid in battery cell plating, impedance reduction to improve cell conditioning, and aid in the state of health determination for a given battery cell.

BACKGROUND OF THE INVENTION

Batteries are used for many functions, to power portable electronics, provide backup sources of power, and power several types of vehicles. However, batteries have a limited lifetime and are often subject to failure and degradation over time. One mechanism of failure is the buildup impurities within the cell "active" area over time. Another mechanism of failure is the growth of dendrites that can possibly extend through the separator and cause a short. Further mechanisms of failure and degradation include increased self-heating of cells and uneven Lithium plating during charging.

Recently, U.S. Pat. No. 10,536,019 disclosed a process and device for charging and discharging a Li—S battery or cell through the use of a pulsed current. This reference discloses the use of variations in current to improve the capacity and life cycle of Li—S batteries. In particular, the process and device utilizes a pulsed current being defined as an "application of current for a limited period of time, followed by an inversion of the current direction for a limited period of time or a pause for a limited period of time," with the pulsed current lasting a period of time between 0.1 second to about 10 hours followed by an inversion during a second period of time between 0.1 second to about 10 hours. The cited prior art teaches that a pulsed current of this duration may be beneficial, however the inventors have found that pulsed currents of a shorter duration and higher amplitude are more beneficial. Still further, the inventors have shown that while the state of the art teaches that broad duration pulses are beneficial, short pulses with a high slew rate have the most benefit and result in an unexpectedly extended life cycle and higher capacity.

Further, U.S. Pat. No. 6,469,473 to one of the above named inventors discloses a method to extend the function of a battery by drawing power from the battery, and repetitively drawing a current pulse from the battery to condition the battery and reduce a memory effect of a battery, wherein the voltage curve of a battery is reduced over time and use. This method was generally configured for use with Nickel Cadmium (NiCad) batteries and utilizes an apparatus configured as a pulser to repetitively draw a current pulse from a battery it is coupled with to generally condition the battery.

This '473 reference, while generally extending the functionality of a battery through conditioning, has been unexpectedly found to offer additional benefits and is of particular use related to active material plating, initial cell forming, dendrite removal, dendrite prevention, state of health determination, newer battery chemistries, such as Lithium Sulfur (Li—S), and placement into an integrated battery management system. Further, additional research and development within the field has shown that for a given current pulse, the slew rate (rate of rise of the current pulse) is the most beneficial aspect of the pulse current method and the driver of the multitude of the capabilities of the method when applied to newer battery chemistries. The pulse duration has a secondary benefit pertaining to ionic contamination, Lithium plating density, and plating uniformity.

SUMMARY OF THE INVENTION

A method and an apparatus in the form of a pulser device for practicing the method of use configured to increase multiple functions of a battery. The method generally utilizes the pulser device that is configured to generate a high amplitude current pulse within a battery cell. Preferably, the method utilizes the apparatus to pull current into or out of the cell utilizing pulses from 1 pulse per minute to as many as 100 pulses per second. The optimal method steps utilize a very short duration pulse (1 μs to 10 ms) having a first current with this first current ideally being a current where the load impedance and cell impedance are equal and with this first current being designated as the inflection point of a given cell. For large or very low impedance cells this current can then be very high, up to hundreds of amps, but not limited to hundreds of amps.

The very short pulse duration generated by the pulser device has been determined to be most effective when the slew rate of the current rising edge is at least 1.0 A/μs with increasing benefit from higher slew rates. This is not to say that lower slew rates down to about 0.1 A/μs are not beneficial, but that certain beneficial effects most notably dendrite suppression may not work. The very short pulse with at least the minimum slew rate has been shown to prevent cell failures, reduce or eliminate the growth and proliferation of dendrites, aid in rapid cell forming, normalize Lithium plating, provide impedance reduction, aid in an accurate determination of a given battery cells state of health (SOH), reduce cell idle time leakage current, and rapid cell impedance stabilization.

BRIEF DESCRIPTION OF THE SEVERAL VIEWS OF THE DRAWING(S)

Figure 2:
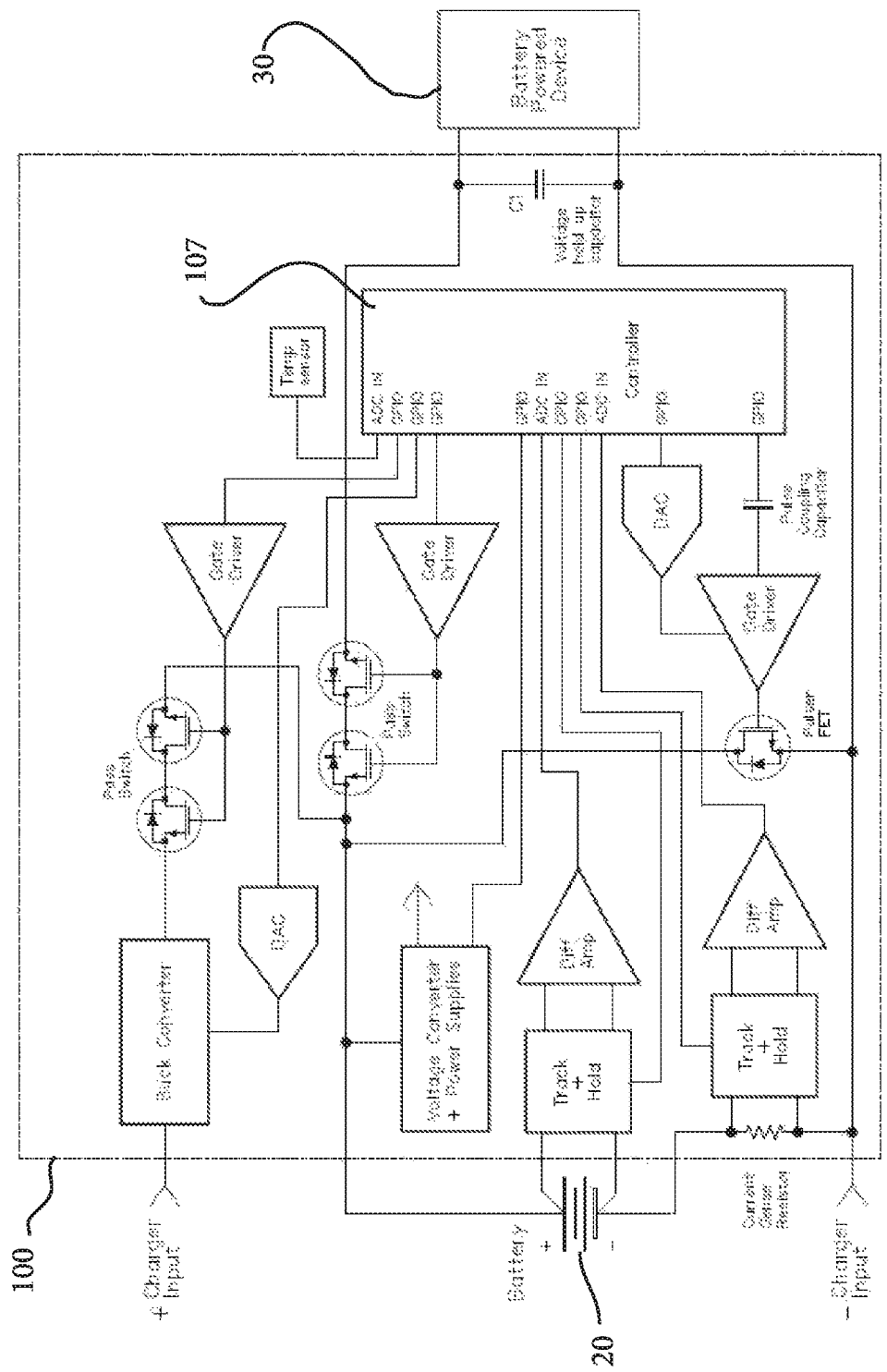

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying drawings, and wherein:

FIG. 1 is a block drawing of the method steps for utilizing a pulse current to enhance the functionality of a battery, according to the present disclosure; and FIG. 2 is a wire frame diagram of an exemplary pulser device in a coupling with a battery, according to the present disclosure.

DETAILED DESCRIPTION OF THE INVENTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

As used herein, the term slew rate is related to a current and is intended to be the rate of rise of a given pulse of current over a defined period of time; it is not the same as the rise time of the pulse. Accordingly, a pulser device delivering a current pulse of 1.0 AMP with a typical pulse rise time of 0.8 μs will have a slew rate of 1.25 A/μs (1.0 A/0.8 μs). Correspondingly, for a 25 Amp pulse having the same rise time the slew rate is now 31.25 A/μs or 25 times higher (25.0 A/0.8 μs). It is only the current rising edge slew rate that is of importance. The current falling edge slew rate is not material to any benefit and should be slow enough so as not to generate any significant voltage spikes at the input to the load device. This equates to a fall time typically greater than 2 μs. In the following discussions which reference slew rate, the reference is only to the current rising edge slew rate.

As used herein, the term high-side is defined as a pulse of current directed by a pulser device into a battery, wherein high-side pulsing will pulse a current into the battery.

As used herein, the term low-side is defined as a pulse of current directed by a pulser device out from a battery, wherein low-side pulsing will pulse a current from the battery.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Referring now to FIG. 1-2, of the pulse current method for improving the functionality of a battery through the use of an associated pulse generating apparatus in the form of the pulser device, generally referred to as pulser 100, for generally performing the method steps of the present disclosure. The pulser 100 as it is referred to herein can be designated as a Pulser, The Pulser, pulsar, The Pulsar, Pulsar, or pulser apparatus and is most generally configured to deliver a dedicated and repetitive pulse of current into or out of a battery and its associated battery cells when in a coupling.

The method generally requires an apparatus, such as the pulser 100, to high-side pulse a current for a defined period of time or low-side pulse a current for a defined period of time with a slew rate of at least 1.0 A/µs. With this current generally being described as a pulse extending for a very short duration of time within the range of 1 µs (one microsecond) to 10 ms (ten milliseconds) and configured to provide increased functionality and performance of the battery coupled to the pulser 100.

Accordingly, this method functions best when the amount of high-side pulsed current or low-side pulsed current is the amount where the load impedance matches the cell impedance at a rate greater than the minimum slew rate of 1.0 A/µs. For low-side pulsing the impedance is matched when the cell voltage of a given cell is decreased to 50% of the no load current. For high-side pulsing the impedance is matched when the cell voltage is increased by a similar 50%. Accordingly, this matched impedance is used to define an optimal current that is to be pulsed into or pulsed out of a given cell by the pulser device 100.

Using the pulser 100 to generate a pulse for a given battery has shown to provide several benefits to the battery, including, but not limited to, rapidly forming and stabilizing new cells, preventing the growth and proliferation of dendrites, accurately having its cell impedance measured, eliminating cell field failures, providing an improved determination of the batteries state of health, and improving the detection of individual cell anomalies within parallel cell groups or subpacks of a given battery.

The method of the present disclosure is generally applicable for all battery types and chemistries, including, but not limited to, nickel-based, such as nickel cadmium or nickel metal hydride, lead-acid, lithium ion, or lithium sulfur. However, the method is most applicable to more of the modern battery chemistries utilizing lithium and sulfur.

The method of the present disclosure requires the pulser 100 to be capable of high-side and low-side pulsing a range of pulse widths (pulse duration) from between 1 µs (one microsecond) to 10 ms (ten milliseconds), a repetitive rate of pulsing from 100 pps (one-hundred pulses per second) to 1 ppm (one pulse per minute), providing a current of up to 60 A (sixty amps) per individual cell and a minimum current slew rate of 1.0 A/µs. Preferably, the pulser 100 is capable of directing a pulse fall time greater than 2 µs (two microseconds).

In the preferred method of the present disclosure, low-side pulsing utilizes the preferred settings, and in particular the slew rate of at least 1.0 A/µs, to reduce the battery voltage of a given cell, during the duration of the pulse, to half (50%) its normal value. This provides for the impedance to be matched, wherein the load impedance matches the cell impedance, which has been shown to be most effective for the batteries tested.

During the current pulse, while the battery voltage is reduced, the battery voltage is disconnected from any device coupled to the battery and the pulser 100. A capacitor or similar system provides power for a device coupled to the battery during this pulsing time. In a preferred embodiment, the battery is disconnected a slight time interval before, and reconnected a small-time interval after the current pulse. This delayed reconnection of the battery together with a fall time greater than 2 µs has the added benefit of preventing the voltage spike that occurs at the end of the current pulse from affecting the device the battery is coupled to.

During the low-side method steps, the apparatus pulses a very short duration but high amplitude current out of coupled cells. These pulses are short, typically between 1 µs and 10 ms long. They also have a very fast rise time of typically 1 µs at a slew rate of at least 1.0 A/µs. In the case where rapid conditioning of a cell is desired, the pulse repetition rate can be quite high, up to 100 pulses per second. For normal use and in particular when a cell is idle or not in use, pulse repetition rates as low as once per minute are effective and at this rate will not measurably increase the cells self-discharge rate. Normally the pulsing apparatus is running at a low rate even when the battery being pulsed is not in use which also allows continuous monitoring of the batteries state of health as well as preventing dendritic growth.

In the preferred method of the present disclosure, high-side pulsing utilizes the preferred settings to increase the battery voltage of a given cell, during the duration of the pulse. During the current pulse, while the battery voltage is increased, the battery voltage is disconnected from any device coupled to the battery and the pulsing apparatus. A capacitor or similar system provides power for a device coupled to the battery during this pulsing time. In an alternate embodiment, the battery is disconnected a slight time interval before, and reconnected a small-time interval after delivery of the current pulse. This prevents the voltage spike that occurs at the end of the current pulse from affecting the device the battery is coupled to.

During the high-side method steps, the apparatus pulses a very short duration but high amplitude current into coupled cells. These pulses are short, typically between 1 µs and 10 ms long. They also have a very fast rise time of about 1 µs at a slew rate of at least 1.0 A/µs. In the case where rapid conditioning of a cell is desired the pulse repetition rate can be quite high, up to 100 pulses per second. For normal use and in particular when a cell is idle or not in use, pulse repetition rates as low as once per minute will work and at this rate will not measurably increase the cells self-discharge rate. Normally the pulsing apparatus is running at a low rate even when the battery being pulsed is not in use which also allows continuous monitoring of the batteries state of health.

The pulsing method works by using a current pulse with a slew rate of at least 1.0 A/µs to pulse a very short duration but high amplitude current into or out of a given cell. Each short intense pulse of current from the pulsing method generates an intense electromagnetic field that gives all ions in the active region a small "push" in one direction. The normal ionic structure of the cell including the electrolyte is not materially affected but the ionic impurities which are "loosely" bound are moved a small amount. By periodically pulsing, many of these ions are driven out of and kept out of the cell active region.

The very rapid rise time, and more particularly, the high slew rate of the pulses is important as this acts like a "small hammer" which has several beneficial effects; first, it breaks up the initial formation of dendrites, preventing them for forming to any measurable extent. It is well known that dendrites can generate shorts within cells which typically does not lead to a "catastrophic failure event" because the onset is gradual and somewhat "self-healing". For some cell chemistries, on occasion, dendritic growth can lead to fires. The most common and typical result of dendrites within a given cell is reduced cell capacity due to increased self-discharge and erratic cell voltage behavior.

Second, the rapid rise time and slew rate of the pulses generates an intense "electromagnetic" gradient which tends to drive ionic contamination out of the cell active region. In the case of lithium ion (Li-Ion) cells, it also seems to prevent contamination driven catalyzed electrolyte "inerting", which renders the cell non-functional, sometimes within seconds. This form of failure has never been observed in pulsed cells.

The pulses during operation of the method steps are actually slightly audible, and the combination of the electromechanical and electromagnetic shock wave from the pulser 100 is what breaks up dendrites and keeps them from forming.

In some cell types, the pulsing method reduces the "grain" size of the particles within the electrodes increasing or at least maintaining the active area and in all cases the pulses stabilize and tend to reduce the internal impedance or resistance of the given cell being pulsed. This also reduces the level of self-heating during normal operation which is beneficial in extending the life of the cell.

Referring again to FIG. 1, the general method steps are provided in a block diagram generally referred to as method 10. The method 10 utilizing a battery 20 coupled to a device 30 and pulsing apparatus (pulser) 100 coupled to at least the battery 20. Alternately, the pulser 100 can be coupled between the battery 20 and the device 30. The first step 101 requires the coupling of pulser 100 to the battery 20 for operation and enhancing the functionality of the battery 20. In preparation for the delivery of a pulse of the battery 20 the pulser 100 will be set to deliver the appropriate pulse based upon the battery 20 type and specifications at step two, indicated as method step 102.

At the third step, indicated as 103, the battery 20 is temporarily disconnected from the device 30 for a brief time. This disconnection at step 103 can either be a physical disconnection, preferably through an active switch 130, power is then supplied to the device via a holdup capacitor 131. In a larger battery system, wherein only one cell at a time is pulsed, an active switch 130 may not be necessary as the voltage drop is quite small relative to the total system voltage. After disconnection of the battery 20 from the device 30, the pulse is delivered to the battery at step 104.

The pulse is delivered at step four, indicated as 104, to the battery is preferably for a time within a range of between 1 µs and 10 ms long and with a typical rise time of 1 µs at a minimum slew rate of 1.0 A/µs and a fall time of greater than 2 µs. The number of pulses at step 104 can be varied across the range of the pulser 100, but most generally will be delivered at a higher repetition rate, up to 100 pulses for seconds, for battery cell conditioning. For long term use, pulse repetition rates as low as once per minute (1 ppm) are effective and at this rate will not measurably increase the cells self-discharge rate and be effective for cell maintenance.

Research has shown that the slew rate of at least 1.0 A/µs is necessary for the pulse method to be effective for dendrite suppression, but a slower slew rate down to 0.1 A/µs may be beneficial for Lithium plating normalization. Accordingly, this slew rate can be very high when the current of a given pulse is delivered for the preferred pulse duration.

After completion of the delivered pulse or pulses at step 104, the battery 20 is physically reconnected to the device 30 through the switch 130 and device 30 function is returned to normal at the fifth step, indicated as 105.

Often, a battery 20, will be pulsed several times throughout a predetermined time interval to maintain optimal battery function and health. Accordingly, at the sixth step, indicated as 106, the method will return to the second step 102.

In the preferred embodiments of the present disclosure, the pulser 100 is provided with the following specifications as shown in TABLE I when utilized for low-side pulsing.

TABLE I

| | |
|---|---|
| Pulse Current | 0.20 A to 60 A * |
| Pulse Width | 1 µs to 10 ms |
| Pulse Rate | Variable pulse rate (1 ppm to 100 pps) |
| Deadtime | Charging or Discharging is turned off 5 µs before Pulser turned on and is turned on 10 µs after Pulser is turned off |
| Minimum Current Risetime Slew Rate | 1.0 A/µs |

* Although this is the current that was tested, this current is related to the cell or battery impedance and therefor there is no actual upper current limit In the preferred embodiments of the present disclosure, the pulser 100 is provided with the following specifications as shown in TABLE II when utilized for high-side pulsing.

TABLE II

| | |
|---|---|
| Pulse Current | 0.20 A to 60 A* |
| Pulse Width | 1 µs to 10 ms |
| Pulse Rate | Variable pulse rate (1 ppm to 100 pps) |
| Deadtime | Charging or Discharging is turned off 5 µs before Pulser turned on and is turned on 10 µs after Pulser is turned off |
| Minimum Slew Rate | 1.0 A/µs |

*Although this is the current that was tested, this current is related to the cell or battery impedance and therefor there is no actual upper current limit While the pulsing method and pulser 100 cannot prevent oxidation and the attendant reduction of usable electrolyte within a given battery cell, it can reduce the contaminants effect on the electrolyte's conductivity. Testing has shown that the method steps and use of the pulser 100 generates a small but measurable reduction of ion-exchange degradation. Typically, it requires more rapid pulsing and is more applicable during the initial cell "forming" process as a testing tool to detect detrimental levels of initial contamination or an incorrect "balance" of electrolyte components.

Referring now to FIG. 2, the exemplary circuitry for the pulser 100 is shown coupled between the battery 20 and the device 30. The pulser 100 utilizes a controller 107 configured to generate a high amplitude current pulse within the battery 20 at a minimum slew rate of at least 1.0 A/µs. The pulser 100 is configured to high-side or low-side pulse the battery 20 through a low repetition rate pulsing. With this optimal current being a current wherein the load impedance and cell impedance are matched.

The pulser 100 utilizes the controller 107 in a coupling with a plurality of components and sub controllers to monitor the battery 20 and alter the pulses of current drawn from or into the battery 20. The plurality of components including, but not limited to, digital to analog converters, analog to digital converters, sensors, capacitors, resistors, amplifiers, field effect transistors, drivers, switches, and other similar components utilized in the development and production of circuits and circuitry.

The pulser device 100 and the associated method steps for use of the pulser 100 are generally configured for operation in four possible quadrants within five domains that can overlap in actual use of the device 100 in a coupling with the battery 20 as is shown in TABLE III. The quadrants and domains generally relating to pulse type (high-side, low-side) and battery status (charge, discharge, idle).

TABLE III

| Pulse Type | Status | | | |
|---|---|---|---|---|
| High-Side | Charge | Discharge | | |
| Low-Side | Charge | Discharge | Idle | |

Accordingly, the first quadrant of use is what is described as high-side pulsing during charge, wherein a high energy (slew rate greater than 1.0 A/µs) pulse of current is input into the battery during the charge stage. This first quadrant appears to be most useful for cell formation as this high-side pulsing can deliver higher energy pulses as the total energy is equal to the current times the voltage, which is higher for the same pulser 100 current. This generates the fastest impedance reduction of all the quadrants during formation. Further, pulser 100 use within this quadrant has been indicated to show usefulness in Lithium plating normalization.

The second quadrant of use is what is described as low-side pulsing during charge, wherein a high energy pulse of current is drawn from the battery during the charge stage. This second quadrant has been shown to be the most beneficial pulsing strategy for the suppression of dendrites and in particular the suppression of dendrites within Li—S batteries. Further, this quadrant can be combined with the first quadrant, wherein during the charge stage, a battery may be both high side and low side pulsed in a sequence to both aid in cell formation and suppress dendrites.

The third quadrant of use is what is described as high-side pulsing during discharge, wherein a high energy pulse of current is input into the battery during the discharge stage. This third quadrant of use has been shown to be useful for Lithium metal "de-plating" normalization and reduce the effect of ionic contamination.

The fourth quadrant of use is what is described as low-side pulsing during discharge, wherein a high energy pulse of current is drawn from the battery during the discharge stage. This fourth quadrant has been shown to be most useful for dendrite suppression, Lithium metal "de-plating" normalization", and reduce the effect of ionic contamination. Much like the first and second quadrants, the pulser 100 can be operated in the third and the fourth quadrants simultaneously during the discharge stage to both high-side and low-side pulse the battery to for use in dendrite suppression and Lithium metal normalization and ionic contamination reduction.

The fifth domain of the pulser 100 use is what is described as low-side pulsing during idle times, wherein a high energy pulse of current is drawn out from the battery when it is not being charged or discharged during use. This fifth domain has shown usefulness in dendrite suppression, leakage current reduction as well as state of charge ("SOC") and state of health ("SOH") determinations.

Each of these quadrants and domains has alternate uses and can be utilized in a variety of orders and can overlap in actual use. Accordingly, during the charge stage, both high-side and low-side pulsing can be conducted. Additionally, during the discharge stage both high-side and low-side pulsing can be conducted. As each of these quadrants has unique benefits, a pulse sequence can be utilized and tailored to individual and desired result for a given battery.

Accordingly, in references to the method steps of FIG. 1, the pulse delivery step 104 may utilized to deliver both high-side and low-side pulses for the treatment of the coupled battery 20 in multiple quadrants during use of the pulser 100. This multi-quadrant use enables the method to achieve results consistent with both high-side and low-side pulsing without the need for an additional device or additional connective steps.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) but that the invention will include all embodiments falling with the scope of the specification.

What is claimed is:

1. A method for improving the function of a battery coupled to a device, the method steps using a pulser apparatus to pulse a current, the method steps comprising:
   temporarily disconnecting the device from the battery;
   coupling the pulser apparatus to the battery;
   pulsing the battery a predetermined number of pulses per minute, the pulses having a pulse width between 1 µs and 10 ms with a slew rate of at least 0.1 A/µs, wherein the pulsing inputs current into the battery at a slew rate of at least 0.1 A/µs during a charge phase of the battery; and
   reconnecting the device to the battery.

2. The method of claim 1, wherein the slew rate is at least 1.0 A/µs.

3. The method of claim 1, wherein the pulsing discharges current from the battery at a slew rate of at least 0.1 A/µs during a charge phase of the battery.

4. The method of claim 1, wherein the pulsing discharges current from the battery at a slew rate of at least 0.1 A/µs during a discharge phase of the battery.

5. The method of claim 1, wherein the pulsing inputs current into the battery at a slew rate between 0.1 A/µs and 1 A/µs during a charge phase of the battery.

6. The method of claim 1, wherein the pulsing inputs current into the battery at a slew rate of at least 0.1 A/µs during a discharge phase of the battery.

7. The method of claim 1, wherein the pulsing predetermined number of pulses includes at least one pulse discharging current from the battery at a slew rate of at least 0.1 A/µs and at least a second pulse inputting current to the battery at a slew rate of at least 0.1 A/µs during a charge phase of the battery.

8. The method of claim 1, wherein the pulsing predetermined number of pulses includes at least one pulse discharging current from the battery at a slew rate of at least 0.1 A/µs and at least a second pulse inputting current to the battery at a slew rate of at least 0.1 A/µs during a discharge phase of the battery.

9. The method of claim 1, wherein the pulsing discharges current from the battery at a slew rate of at least 0.1 A/µs during an idle phase of the battery.

10. The method of claim 1, wherein the predetermined number of pulses is between 10 pulses per second and 100 pulses per second.

11. The method of claim 1, wherein the predetermined number of pulses is between 10 pulses per second and 1 pulse per minute.

12. The method of claim 1, wherein the pulser apparatus provides a high-side pulsed current amount for a pre-determined pulse duration configured to increase a voltage of one or more cells of the battery or a low-side pulsed current amount for a pre-determined pulse duration configured to reduce the voltage of one or more cells of the battery, wherein the amount of the high-side pulsed current amount or low-side pulsed current amount to obtain an optimal current is established by matching a load impedance of the battery to a cell impedance of the battery, wherein the minimum slew rate is at least 1 A/µs.

13. The method of claim 12, wherein for the low-side pulsed current amount the load impedance is matched when a cell voltage of the one or more cells of a battery is decreased to 50% of the no load current of the cell, and wherein for the high side pulsed current amount the impedance is matched when the cell voltage is increased by 50%.

14. A method for conditioning a cell of a battery coupled to a device, the method steps using a pulsing apparatus to pulse a current, the method steps comprising:
temporarily disconnecting the device from the battery;
coupling the pulsing apparatus to the battery;
pulsing the battery a rate up to 100 pulses per second, the pulses directed at a slew rate of at least 0.1 A/µs to the battery, wherein the pulser provides a high-side pulsed current amount for a pre-determined pulse duration to increase a voltage of the cell or a low-side pulsed current amount for a pre-determined pulse duration configured to reduce a voltage the cell,
wherein the pulsing inputs current into the battery at a slew rate of at least 0.1 A/µs during a charge phase of the battery; and
reconnecting the device to the battery.

15. The method of claim 14, wherein the slew rate is at least 1.0 A/µs.

16. The method of claim 14, wherein the pulsing discharges current from the battery at a slew rate of at least 0.1 A/µs during a charge phase of the battery.

17. The method of claim 14, wherein the pulsing discharges current from the battery at a slew rate of at least 0.1 A/µs during a discharge phase of the battery.

18. The method of claim 14, wherein the pulsing inputs current into the battery at a slew rate of at least 0.1 A/µs during a discharge phase of the battery.

19. The method of claim 14, wherein the pulsing includes at least one pulsed discharging current from the battery at a slew rate of at least 0.1 A/µs and at least a second pulsed inputting current to the battery at a slew rate of at least 0.1 A/µs during a charge phase of the battery.

20. The method of claim 14, wherein the pulsing includes at least one pulsed discharging current from the battery at a slew rate of at least 0.1 A/µs and at least a second pulsed inputting current to the battery at a slew rate of at least 0.1 A/µs during a discharge phase of the battery.

21. The method of claim 14, wherein the pulsing discharges current from the battery at a slew rate of at least 0.1 A/µs during an idle phase of the battery.

22. A method for maintaining a cell of a Li—S battery coupled to a device, the method steps using a pulsing apparatus to pulse a current, the method steps comprising:
temporarily disconnecting the device from the battery;
coupling the pulsing apparatus to the battery;
pulsing the battery a predetermined number of pulses per minute, the
pulses having a pulse width between 1 µs and 10 ms at a slew rate of at least 0.1 A/µs to the battery, wherein the pulsing apparatus provides a high-side pulsed current amount for a pre-determined pulse duration to increase a voltage of the cell or a low-side pulsed current amount for a pre-determined pulse duration configured to reduce the voltage the cell of the Li—S battery,
wherein the amount of the high-side pulsed current amount or low-side pulsed current amount to obtain an optimal current is established by matching a load impedance of a cell impedance of the cell,
wherein the pulsing inputs current into the battery at a slew rate of at least 0.1 A/µs during a charge phase of the battery; and
reconnecting the device to the battery.

23. The method of claim 22, wherein the slew rate is at least 1.0 A/µs.

24. The method of claim 22, wherein the pulsing discharges current from the battery at a slew rate of at least 0.1 A/µs during a charge phase of the battery.

25. The method of claim 22, wherein the pulsing discharges current from the battery at a slew rate of at least 0.1 A/µs during a discharge phase of the battery.

26. The method of claim 22, wherein the pulsing inputs current into the battery at a slew rate of at least 0.1 A/µs during a discharge phase of the battery.

27. The method of claim 22, wherein the pulsing predetermined number of pulses includes at least one pulse discharging current from the battery at a slew rate of at least 0.1 A/µs and at least a second pulse inputting current to the battery at a slew rate of at least 0.1 A/µs during a charge phase of the battery.

28. The method of claim 22, wherein the pulsing predetermined number of pulses includes at least one pulse discharging current from the battery at a slew rate of at least 0.1 A/µs and at least a second pulse inputting current to the battery at a slew rate of at least 0.1 A/µs during a discharge phase of the battery.

29. The method of claim 22, wherein the pulsing discharges current from the battery at a slew rate of at least 0.1 A/µs during an idle phase of the battery.

* * * * *